United States Patent
Omori et al.

(10) Patent No.: US 8,077,226 B2
(45) Date of Patent: Dec. 13, 2011

(54) DATA PROCESSING APPARATUS HAVING PARALLEL PROCESSING ZOOM PROCESSORS

(75) Inventors: Minoru Omori, Osaka (JP); Takehiko Kanda, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 402 days.

(21) Appl. No.: 12/359,575

(22) Filed: Jan. 26, 2009

(65) Prior Publication Data
US 2009/0190004 A1 Jul. 30, 2009

(30) Foreign Application Priority Data
Jan. 26, 2008 (JP) ................................. 2008-015695

(51) Int. Cl.
H04N 5/262 (2006.01)
H04N 5/222 (2006.01)

(52) U.S. Cl. ................................. 348/240.2; 348/333.01

(58) Field of Classification Search ............... 348/222.1, 348/230.1, 240.99, 240.2, 333.01, 333.05, 348/333.11, 333.12
See application file for complete search history.

(56) References Cited

U.S. PATENT DOCUMENTS

| | | | | |
|---|---|---|---|---|
| 5,933,137 | A * | 8/1999 | Anderson | 715/720 |
| 7,663,779 | B2 * | 2/2010 | Nagao et al. | 358/1.2 |
| 7,733,389 | B2 * | 6/2010 | Kurosawa et al. | 348/240.2 |
| 2001/0036359 | A1 * | 11/2001 | Nishikawa et al. | 386/109 |
| 2001/0055066 | A1 * | 12/2001 | Nozawa | 348/240 |
| 2007/0257996 | A1 * | 11/2007 | Kurosawa et al. | 348/240.99 |

FOREIGN PATENT DOCUMENTS
JP 2004-40519 A 2/2004
* cited by examiner

*Primary Examiner* — Nicholas Giles
(74) *Attorney, Agent, or Firm* — Westerman, Hattori, Daniels & Adrian, LLP (57) ABSTRACT

A data processing apparatus includes a zoom circuit for displaying and a zoom circuit for recording. The zoom circuit for displaying performs a zoom process using a least square method or linear interpolation on image data from a YUV conversion circuit so as to create display image data. On an LCD monitor, an image based on the display image data thus created is displayed. Furthermore, the zoom circuit for recording performs a zoom process using spline interpolation or linear interpolation on image data from the YUV conversion circuit so as to create recording image data. The zoom process for recording is executed in parallel with the zoom process for displaying. The recording image data thus created is recorded in a recording medium.

5 Claims, 12 Drawing Sheets

(A) PHOTOGRAPHED IMAGE (B) DISPLAY IMAGE (C) RECORDING IMAGE
(HIGH IMAGE QUALITY)

(D) RECORDING IMAGE
(LOW IMAGE QUALITY)

(A) PHOTOGRAPHED IMAGE (B) DISPLAY IMAGE (C) RECORDING IMAGE
(HIGH IMAGE QUALITY)

(D) RECORDING IMAGE
(LOW IMAGE QUALITY)

FIG. 4

(A) CROPPED IMAGE (B) DISPLAY IMAGE (C) RECORDING IMAGE
(HIGH IMAGE QUALITY)

(D) RECORDING IMAGE
(LOW IMAGE QUALITY)

FIG. 5

(A) CROPPED IMAGE (B) DISPLAY IMAGE (C) RECORDING IMAGE
(HIGH IMAGE QUALITY)

(D) RECORDING IMAGE
(LOW IMAGE QUALITY)

(A) ZOOM FOR DISPLAYING (B) ZOOM FOR RECORDING (HIGH IMAGE QUALITY)

(C) ZOOM FOR RECORDING (LOW IMAGE QUALITY)

DATA PROCESSING APPARATUS HAVING PARALLEL PROCESSING ZOOM PROCESSORS

CROSS REFERENCE OF RELATED APPLICATION

The disclosure of Japanese Patent Application No. 2008-15695, which was filed on Jan. 26, 2008 is incorporated herein by reference.

BACKGROUND OF THE INVENTION

1. Field of the Invention

The present invention relates to a data processing apparatus, and relates to a data processing apparatus which is applied to a digital camera, for example, and which individually creates a display image and a recording image associated with each other.

2. Description of the Related Art

According to one example of this type of apparatus, when desired raw image data is secured in an SDRAM, freeze image data for displaying is generated based on the raw image data. The generated freeze image data is applied to a JPEG compression according to an initial compression rate, and the optimal compression rate is calculated based on the compressed freeze image data and the initial compression rate. When the optimal compression rate is calculated, main image data for recording is generated based on the raw image data on the SDRAM, and the generated main image data is compressed by the optimal compression rate.

However, this apparatus has a problem that a process for generating the freeze image data for displaying and a process for generating the main image data for recording are executed in series, and thus, processing is time consuming.

SUMMARY OF THE INVENTION

A data processing apparatus according to the present invention comprises: a first zoom processor for creating display image data by performing a first-manner zoom process on original image data; a displayer for displaying an image based on the display image data created by the first zoom processor; a second zoom processor for creating recording image data by performing a second-manner zoom process parallel to the first-manner zoom process, on the original image data; and a recorder for recording the recording image data created by the second zoom processor into a recording medium.

Preferably, the first zoom processor includes a first interpolator for executing in parallel a plurality of first interpolating processes different to one another and a first weighted adder for performing weighted-addition considering a difference between a number of pixels of the original image data and a number of pixels of the display image data, on a plurality of outputs from the first interpolator, and the second zoom processor includes a second interpolator for executing in parallel a plurality of second interpolating processes different to one another and a second weighted adder for performing weighted-addition considering a difference between a number of pixels of the original image data and a number of pixels of the recording image data, on a plurality of outputs from the second interpolator.

More preferably, the number of pixels of the display image data is smaller than the number of pixels of the recording image data, the first interpolator includes a first specific interpolator for reduction zoom, and the second interpolator includes a second specific interpolator for enlargement zoom.

In an aspect the first specific interpolator executes an interpolating process according to a least square method, and the second specific interpolator executes a spline interpolating process.

In another aspect a number-of-pixels changer for changing the number of pixels of the original image data in response to a zoom operation; a first weighted-amount changer for increasing a weighted amount for the first specific interpolator in a range within which the number of pixels of the original image data falls below a first reference value; and a second weighted-amount changer for increasing a weighted amount for the second specific interpolator in a range within which the number of pixels of the original image data exceeds a second reference value are further comprised.

In an embodiment, the first reference value corresponds to the number of pixels of the display image data, and the second reference value corresponds to the number of pixels of the recording image data.

Preferably, each of the original image data, the display image data, and the recording image data is image data representing a moving image.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
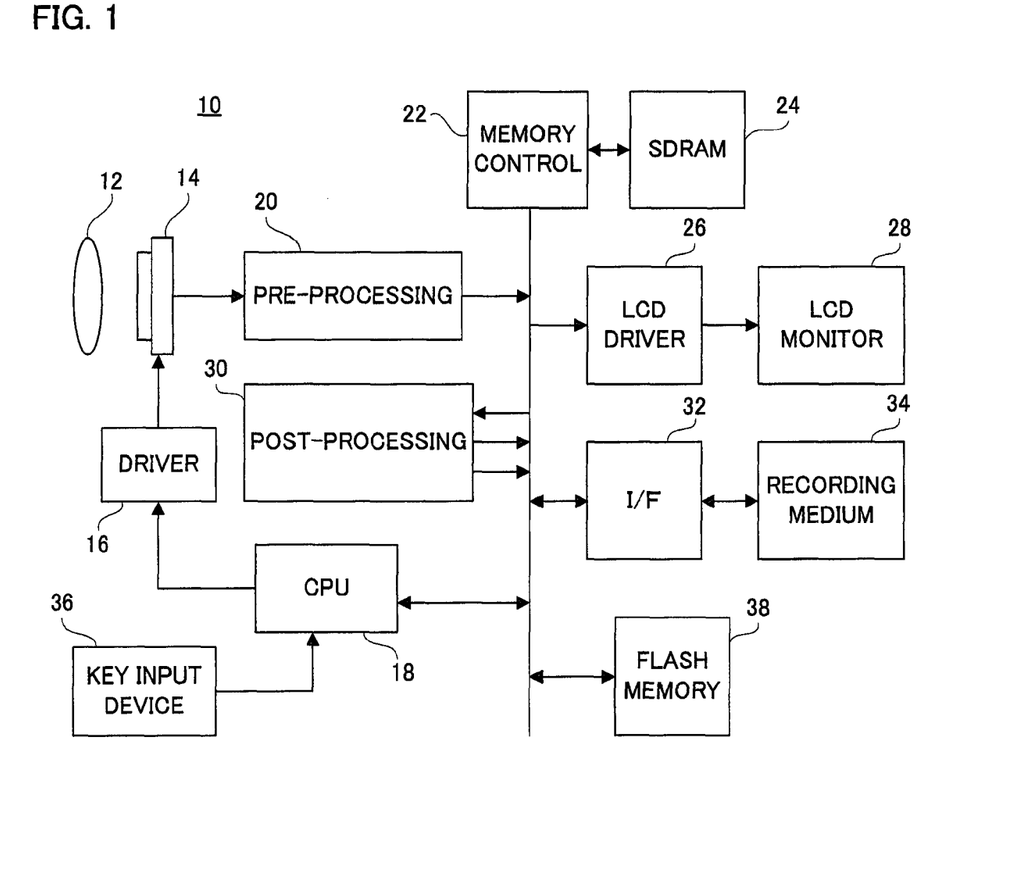
FIG. 1 is a block diagram showing a configuration of one embodiment of the present invention.

With reference to FIG. 1, a digital camera 10 according to this embodiment includes an optical lens 12. An optical image of an object scene is irradiated onto an imaging surface of an imaging device 14 through the optical lens 12. The imaging surface has an effective image area of horizontal 1920 pixels× vertical 1080 pixels, and is covered with a primary color filter (not shown) having a Bayer array. Therefore, in each pixel, electric charges having any one of color information, i.e., R (red), G (green), and B (blue), are generated by photoelectric conversion.

When a power supply is turned on, a CPU 18 starts a driver 16 in order to execute a through-image process. In response to a vertical synchronization signal Vsync occurring at every 1/30 seconds, the driver 16 exposes the imaging surface and reads out the electric charges generated on the imaging surface in a raster scanning manner. A raw image signal of horizontal 1920 pixels×vertical 1080 pixels is outputted at a frame rate of 30 fps from the imaging device 14.

Figure 2:
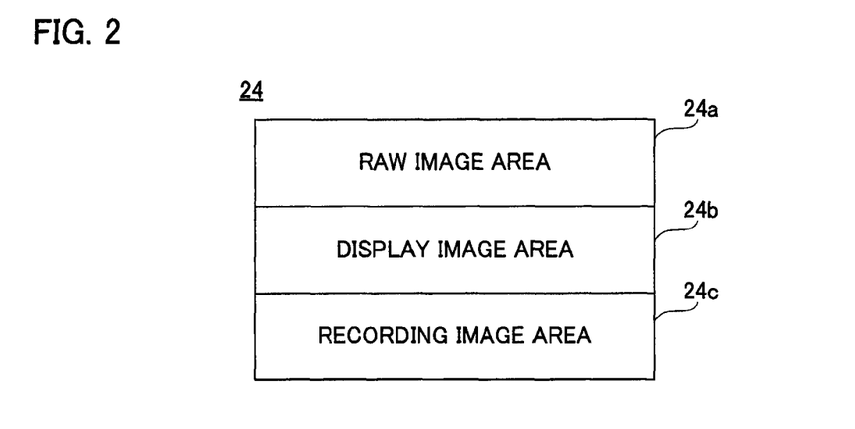
FIG. 2 is an illustrative view showing one example of a mapping state of an SDRAM applied to the embodiment in FIG. 1.

A pre-processing circuit 20 performs processes, such as a correlated double sampling, an automatic gain adjustment, and an A/D conversion, on the raw image signal from the imaging device 14, and writes raw image data generated thereby into a raw image area 24a (see FIG. 2) of an SDRAM 24 through a memory control circuit 22. A post-processing circuit 30 reads out the raw image data accommodated in the raw image area 24a through the memory control circuit 22 at every 1/30 seconds, and performs processes, such as a color separation, a white balance adjustment, a YUV conversion, and zoom for displaying, on the read-out raw image data. As a result, display image data of horizontal 640 pixels×vertical 360 pixels corresponding to a YUV format is created at every 1/30 seconds.

The created display image data is written into a display image area 24b (see FIG. 2) of the SDRAM 24 through the memory control circuit 22. An LCD driver 26 repeatedly reads out the display image data accommodated in the display image area 24b, and drives an LCD monitor 28 based on the read-out display image data. As a result, a real-time moving image (through image) representing an object scene is displayed on a monitor screen. When an object scene shown in FIG. 3(A) is captured by an imaging surface, the through image is displayed on the monitor screen according to a procedure shown in FIG. 3(B).

When a zoom operation is performed by a key input device 36, the CPU 18 designates one portion of an area on the raw image area 24b as a cropping area. That is, the entire area on the raw image area 24b is originally considered as a cropping area, and when the zoom operation is performed, the size and position of the cropping area are changed.

The memory control circuit 22 reads out one portion of the raw image data belonging to the designated cropping area through at every 1/30 seconds, and the post-processing circuit 30 performs the processes similar to those described above on the read-out raw image data to create display image data of horizontal 640 pixels×vertical 360 pixels. As a result, one portion of the through image belonging to the cropping area is displayed on the monitor screen.

Figure 3:
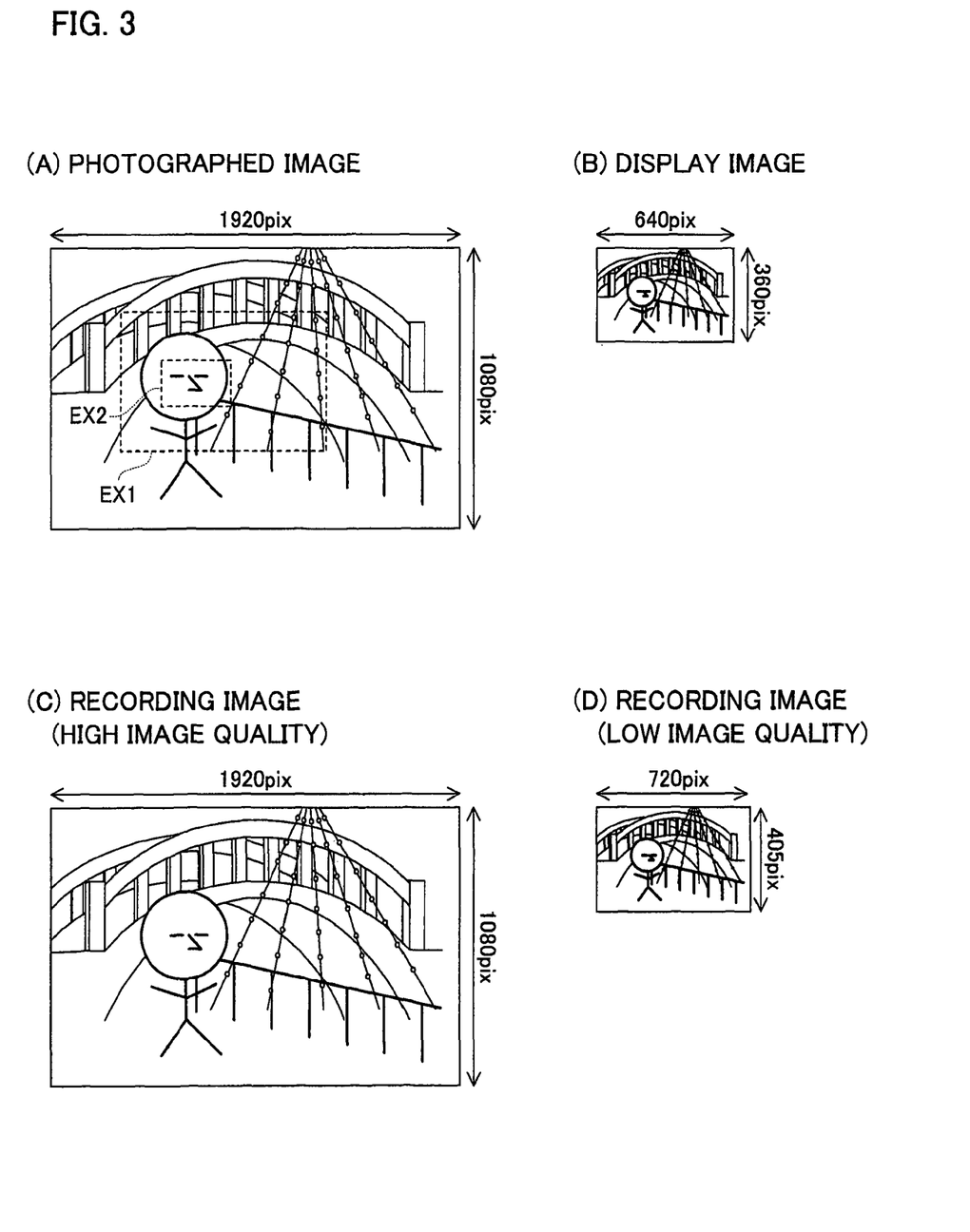
FIG. 3(A) is an illustrative view showing one example of a photographed image.
FIG. 3(B) is an illustrative view showing one example of a display image.
FIG. 3(C) is an illustrative view showing one example of a high-quality recording image.
FIG. 3(D) is an illustrative view showing one example of a low-quality recording image.
Figure 4:
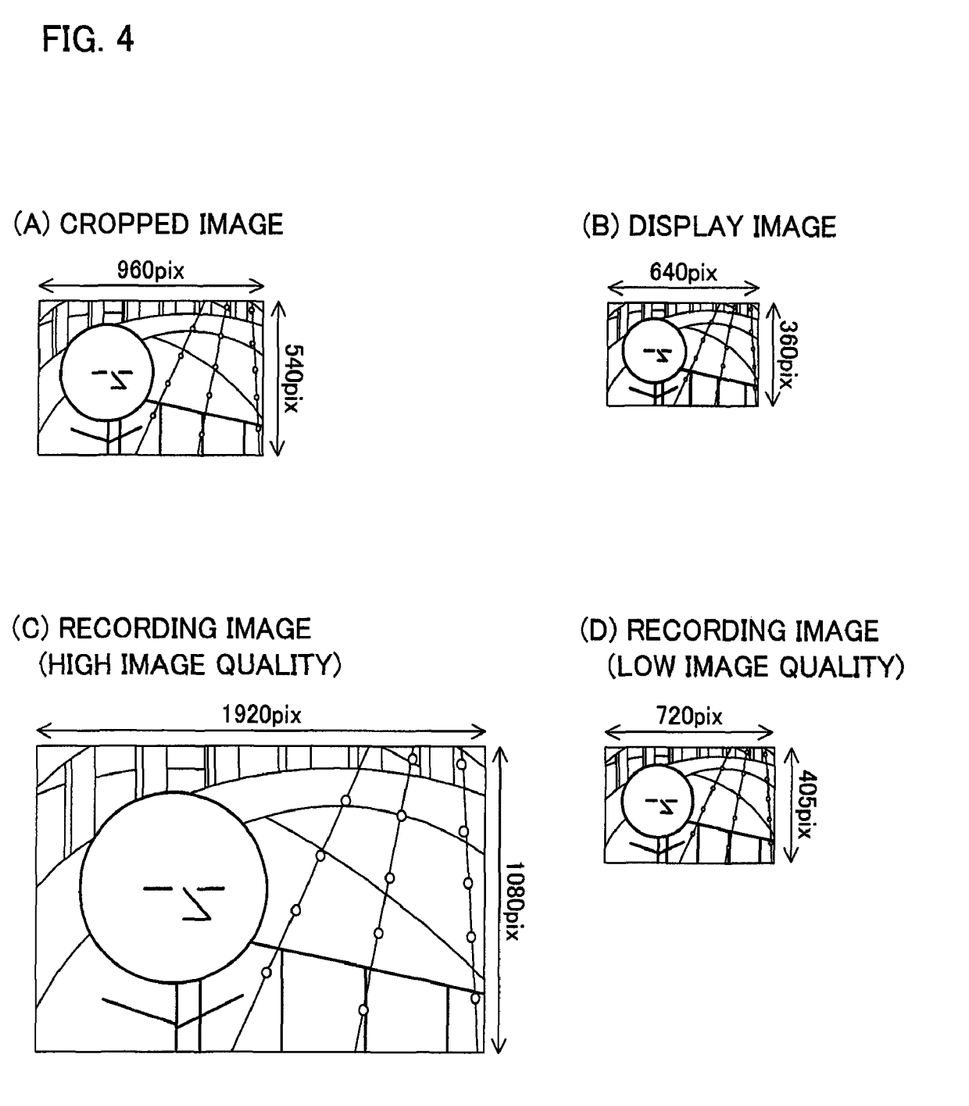
FIG. 4(A) is an illustrative view showing one example of a cropped image.
FIG. 4(B) is an illustrative view showing one example of a display image.
FIG. 4(C) is an illustrative view showing one example of a high-quality recording image.
FIG. 4(D) is an illustrative view showing one example of a low-quality recording image.
Figure 5:
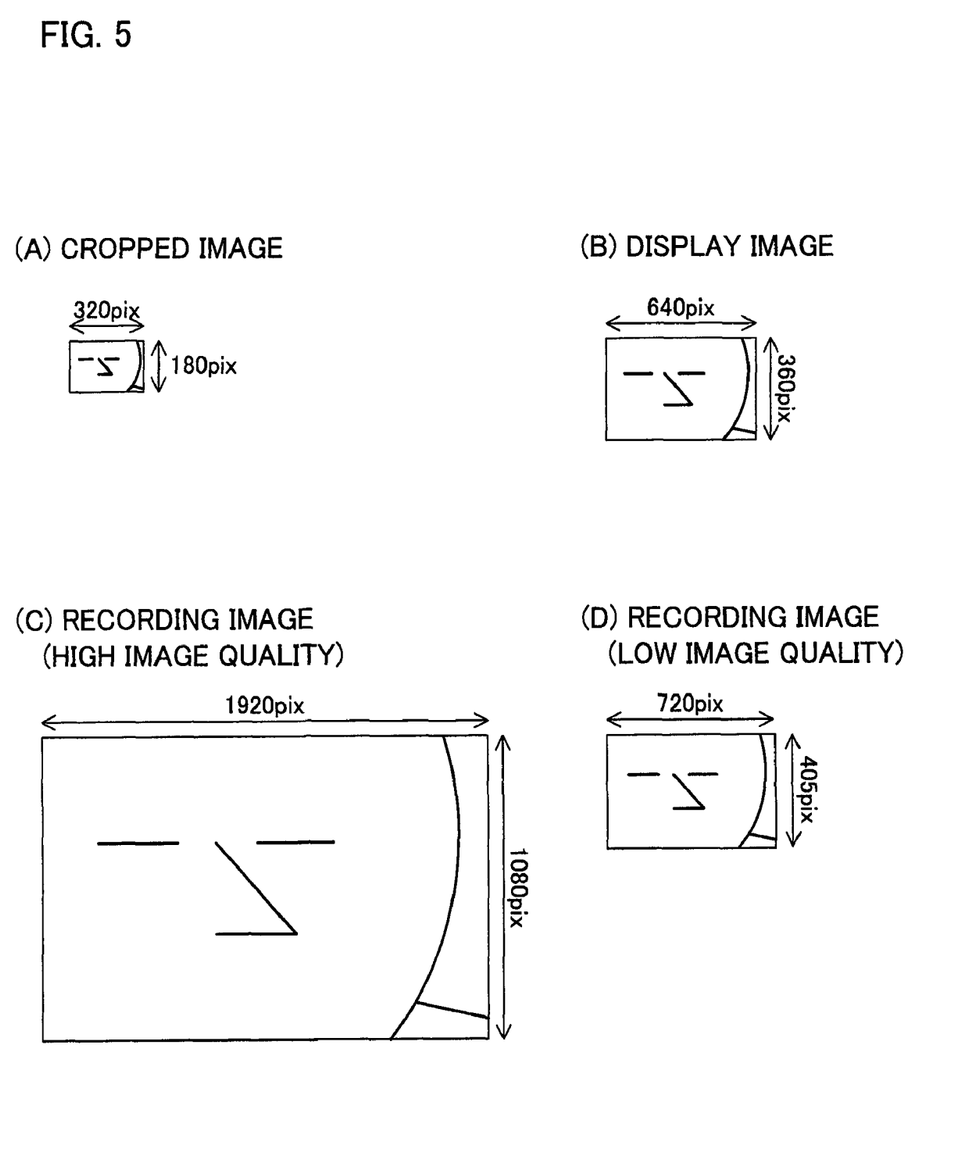
FIG. 5(A) is an illustrative view showing one example of a cropped image.
FIG. 5(B) is an illustrative view showing one example of a display image.
FIG. 5(C) is an illustrative view showing one example of a high-quality recording image.
FIG. 5(D) is an illustrative view showing one example of a low-quality recording image.

When a partial area EX1 shown in FIG. 3(A) is considered as the cropping area, one portion of a photographed image shown in FIG. 4(A) is applied to a post-process. A through image is displayed on the monitor screen according to a procedure shown in FIG. 4(B). Furthermore, when a partial area EX2 shown in FIG. 3(A) is considered as the cropping area, one portion of a photographed image shown in FIG. 5(A) is applied to a post-process. A through image is displayed on the monitor screen according to a procedure shown in FIG. 5(B).

When a recording start operation is performed on the key input device 36, the CPU 18 applies a recording starting instruction to the post-processing circuit 30 and an I/F 32 in order to start a recording process. As a recording image quality, "high image quality" and "low image quality" are prepared, and before the recording start operation, either one of the "high image quality" and the "low image quality" is selected. The selected recording image quality is written in the recording starting instruction.

The post-processing circuit 30 performs zoom for recording corresponding to the recording image quality written in the recording instruction, on the YUV-converted image data. As a result, when the "high image quality" is selected, recording image data of horizontal 1920 pixels×vertical 1080 pixels is created, and when the "low image quality" is selected, recording image data of horizontal 720 pixels×vertical 405 pixels is created. The zoom for recording is executed in parallel with the zoom for displaying, and the recording image data is also created at every 1/30 seconds.

When the through image shown in FIG. 3(B) is displayed on the LCD monitor 28, recording image data shown in FIG. 3(C) is created corresponding to the "high image quality", and recording image data shown in FIG. 3(D) is created corresponding to the "low image quality". Furthermore, when the through image shown in FIG. 4(B) is displayed on the LCD monitor 28, recording image data shown in FIG. 4(C) is created corresponding to the "high image quality", and recording image data shown in FIG. 4(D) is created corresponding to the "low image quality". In addition, when the through image shown in FIG. 5(B) is displayed on the LCD monitor 28, recording image data shown in FIG. 5(C) is created corresponding to the "high image quality", and recording image data shown in FIG. 5(D) is created corresponding to the "low image quality".

The created recording image data is written to a recording image area 24c of the SDRAM 24 through the memory control circuit 22. The I/F 32 repeatedly reads out the recording image data accommodated in the recording image area 24c through the memory control circuit 22, and performs a compression process according to an H264 system, on the read-out recording image data. The compressed recording image data, i.e., H264 data, is recorded in a recording medium 34 in a file format.

When a recording end operation is performed on the key input device 36, the CPU 18 applies a recording end instruction to the post-processing circuit 30 and the I/F 32 in order to end the recording process. The post-processing circuit 30 quickly ends the generation of the recording image data, and the I/F 32 ends the process after all the recording image data within the recording image area 24c are recorded. It is noted that the change of the cropping area in response to a zoom operation is also performed during the execution of the recording process.

Figure 6:
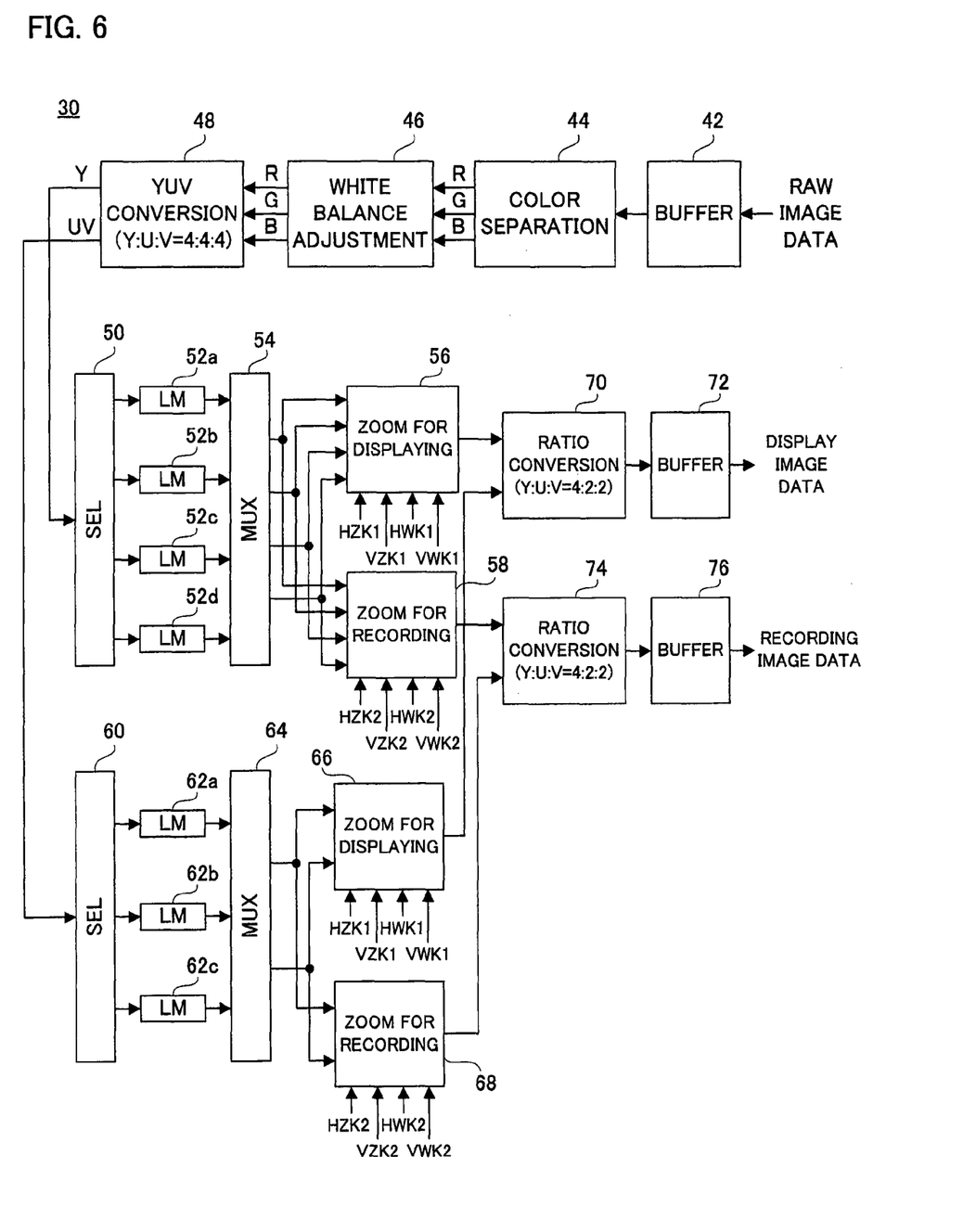
FIG. 6 is a block diagram showing one example of a configuration of a post-processing circuit applied to an embodiment in FIG. 1.

The post-processing circuit 30 is configured as shown in FIG. 6. Raw image data is applied to a color separation circuit 44 via a buffer 42 so as to be subjected to a color separating process. As a result, RGB image data in which each pixel has all color information of R, Q and B is generated. A white balance of the generated RGB image data is adjusted by a white-balance adjusting circuit 46, and the RGB image data having the adjusted white balance is converted into image data in a YUV format (Y:U:V=4:4:4) by a YUV conversion circuit 48. Out of the converted image data, the Y data is applied to a selector 50, and the UV data is applied to a selector 60.

The selector 50 writes the Y data in a (4n+1)-th line (n: 0, 1, 2, 3, . . . , the same applies hereinafter) into a line memory 52a, writes the Y data in a (4n+2)-th line to the line memory 52b, writes the Y data in a (4n+3)-th line to the line memory 52c, and writes the Y data in a (4n+4)-th line to the line memory 52d.

A multiplexer 54 simultaneously reads out four lines of Y data accommodated in the line memories 52a to 52d according to an FIFO system, and applies the read-out four lines of Y data to each of a zoom circuit for displaying 56 and a zoom circuit for recording 58 in a manner that the line number is sorted in ascending order.

On the other hand, the selector 60 writes the UV data in a (3n+1)-th line to a line memory 62a, writes the UV data in a (3n+2)-th line to a line memory 62b, and writes the UV data in a (3n+3)-th line to a line memory 62c. A multiplexer 64 simultaneously reads out two lines of the UV data accommodated in the two line memories out of the line memories 62a to 62c according to an FIFO system, and applies the read-out two lines of the UV data to each of a zoom circuit for displaying 66 and a zoom circuit for recording 68 in a manner that the line number is sorted in ascending order.

Each of the zoom circuits for displaying 56 and 66 is applied a horizontal zoom coefficient for displaying HZK1, a vertical zoom coefficient for displaying VZK1, a horizontal weighting coefficient for displaying HWK1, and a vertical weighting coefficient for displaying VWK1, each of which corresponds to a difference between the number of pixels within the cropping area and the number of pixels of the display image data. Each of the zoom circuits for recording 58 and 68 is also applied a horizontal zoom coefficient for recording HZK2, a vertical zoom coefficient for recording VZK2, a horizontal weighting coefficient for recording HWK2, and a vertical weighting coefficient for recording VWK2, each of which corresponds to a difference between the number of pixels within the cropping area and the number of pixels of the recording image data.

It is noted that each of the horizontal zoom coefficient for displaying HZK1 and the vertical zoom coefficient for displaying VZK1 is equivalent to a numerical value obtained by dividing the number of pixels of the display image data by the number of pixels of the cropping area. Furthermore, each of the horizontal zoom coefficient for recording HZK2 and the vertical zoom coefficient for recording VZK2 is equivalent to a numerical value obtained by dividing the number of pixels of the recording image data by the number of pixels of the cropping area. The horizontal weighting coefficient for displaying HWK1, the vertical weighting coefficient for displaying VWK1, the horizontal weighting coefficient for recording HWK2 and the vertical weighting coefficient for recording VWK2 are described later.

Each of the zoom circuits for displaying 56 and 66 executes zoom for displaying according to the applied horizontal zoom coefficient for displaying HZK1, vertical zoom coefficient for displaying VZK1, horizontal weighting coefficient for displaying HWK1, and vertical weighting coefficient for displaying VWK1. Each of the zoom circuits for recording 58 and 68 executes zoom for recording according to the applied horizontal zoom coefficient for recording HZK2, vertical zoom coefficient for recording VZK2, horizontal weighting coefficient for recording HWK2, and vertical weighting coefficient for recording VWK2. The Y data and the UV data respectively outputted from the zoom circuits for displaying 56 and 66 are applied to a ratio conversion circuit 70, and the Y data and UV data respectively outputted from the zoom circuits for recording 58 and 68 are applied to a ratio conversion circuit 74.

Each of the ratio conversion circuits 70 and 74 converts a ratio of the Y data and the UV data from Y:U:V=4:4:4 to Y:U:V=4:2:2. As a result, display image data is outputted from the ratio conversion circuit 70, and recording image data is outputted from the ratio conversion circuit 74. The display image data is outputted to the memory control circuit 22 via a buffer 72, and the recording image data is outputted to the memory control circuit 22 via a buffer 76.

Figure 7:
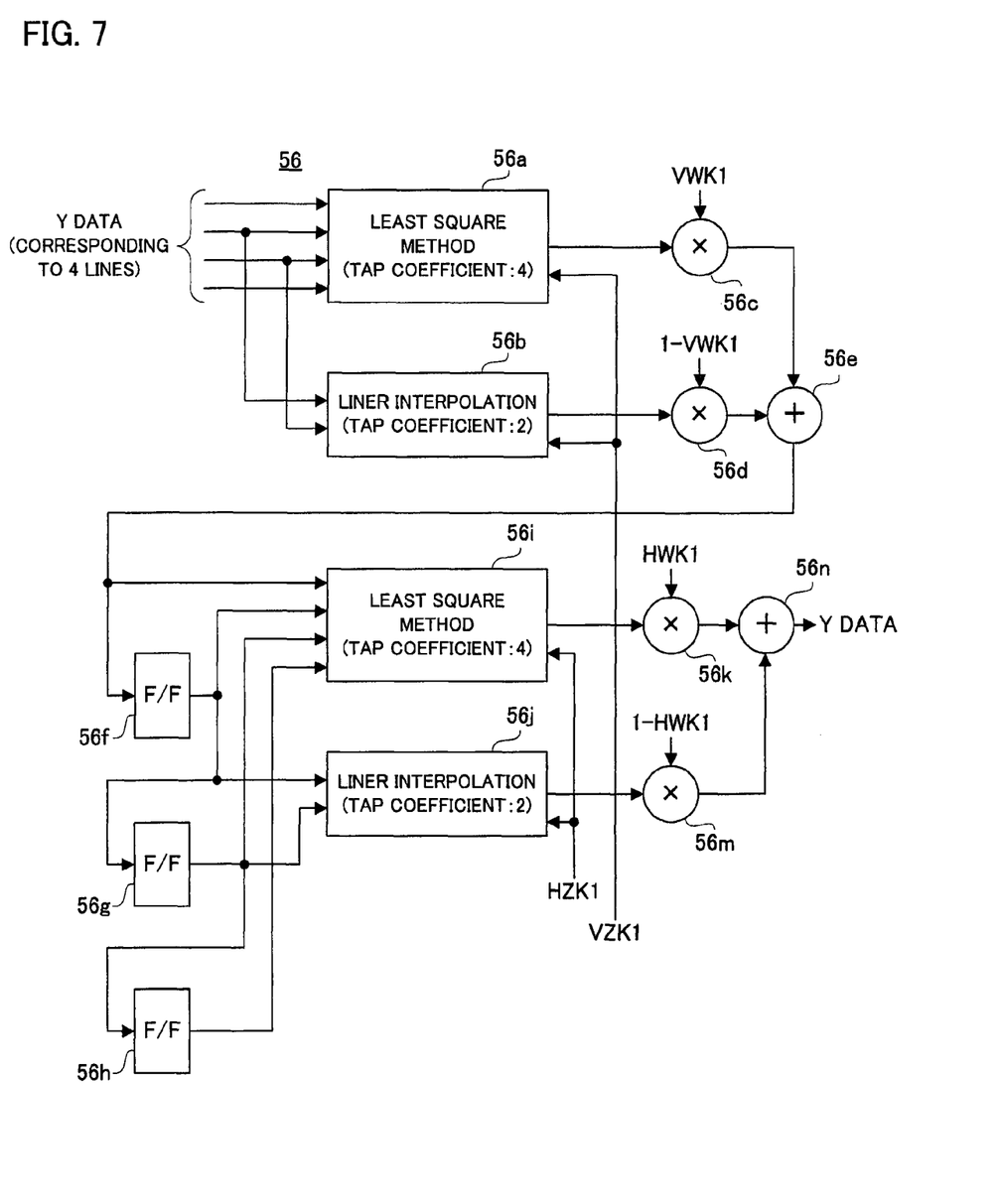
FIG. 7 is a block diagram showing one example of a configuration of a zoom circuit for displaying applied to the embodiment in FIG. 6.

The zoom circuit for displaying 56 is configured as shown in FIG. 7. Inputted four lines of Y data are applied to an interpolation circuit 56a, and the central two lines (out of the inputted four lines) of Y data are applied to an interpolation circuit 56b. The interpolation circuit 56a adopts a least square method suitable for a reduction zoom as an interpolation method. On the other hand, the interpolation circuit 56b adopts versatile linear interpolation as an interpolation method.

Each of the interpolation circuits 56a and 56b creates 1-line of Y data by an interpolating process with reference to the vertical zoom coefficient for displaying VZK1. A multiplier 56c multiplies the Y data outputted from the interpolation circuit 56a by the vertical weighting coefficient for displaying VWK1, and a multiplier 56d multiplies the Y data outputted from the interpolation circuit 56b by "1-VWK1". The outputs from the multipliers 56c and 56d are then added to each other by an adder 56e. Thus, the vertical zoom is completed.

The Y data outputted from the adder 56e is directly applied to an interpolation circuit 56i, and also applied to the interpolation circuit 56i through at least one of F/F circuits 56f, 56g, and 56h connected in series. The Y data outputted from the respective F/F circuits 56f and 56g are also applied to an interpolation circuit 56j. That is, horizontal 4-pixels of Y data are simultaneously inputted to the interpolation circuit 56i, and Y data of the central two pixels out of the horizontal four pixels are simultaneously inputted to the interpolation circuit 56j.

The interpolation circuit 56i adopts a least square method as an interpolation method, and the interpolation circuit 56j adopts a linear interpolation as an interpolation method. Each of the interpolation circuits 56i and 56j creates 1-pixel of Y data by an interpolating process with reference to the horizontal zoom coefficient for displaying HZK1. A multiplier 56k multiplies the Y data outputted from the interpolation circuit 56i by the horizontal weighting coefficient for displaying HWK1, and a multiplier 56m multiplies the Y data outputted from the interpolation circuit 56j by "1-HWK1". The outputs from the multipliers 56k and 56m are then added to each other by an adder 56n. Thus, the horizontal zoom is completed.

Figure 8:
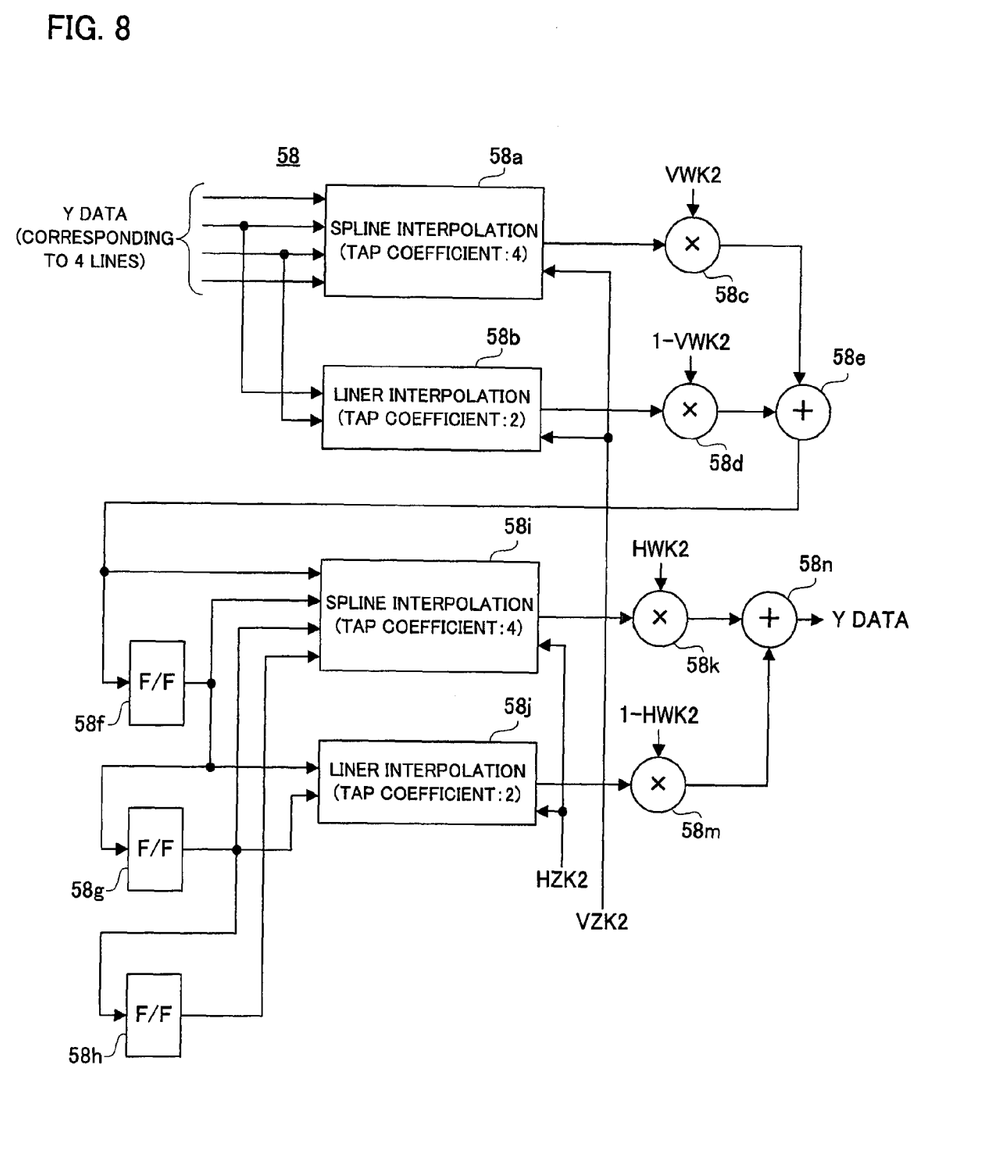
FIG. 8 is a block diagram showing one example of a configuration of a zoom circuit for recording applied to the embodiment in FIG. 6.

The zoom circuit for recording 58 is configured as shown in FIG. 8. It is noted that the zoom circuit for recording 58 is the same as the zoom circuit for displaying 56 except for that interpolation circuits 58a and 58i execute spline interpolation suitable for an enlargement zoom in place of the interpolation according to the least square method, the interpolation circuits 58a and 58b refer to the vertical zoom coefficient for recording VZK2 in place of the vertical zoom coefficient for displaying VZK1, the interpolation circuits 58i and 58j refer to the horizontal zoom coefficient for recording HZK2 in place of the horizontal zoom coefficient for displaying HZK1, a multiplier 58c uses the vertical weighting coefficient for recording VWK2 in place of the vertical weighting coefficient for displaying VWK1, a multiplier 58k uses the horizontal weighting coefficient for recording HWK2 in place of the horizontal weighting coefficient for displaying HWK1, a multiplier 58d uses "1-VWK2" in place of the "1-VWK1", and a multiplier 58m uses "1-HWK2" in place of the "1-HWK1". Thus, the duplicated description is omitted.

Figure 9:
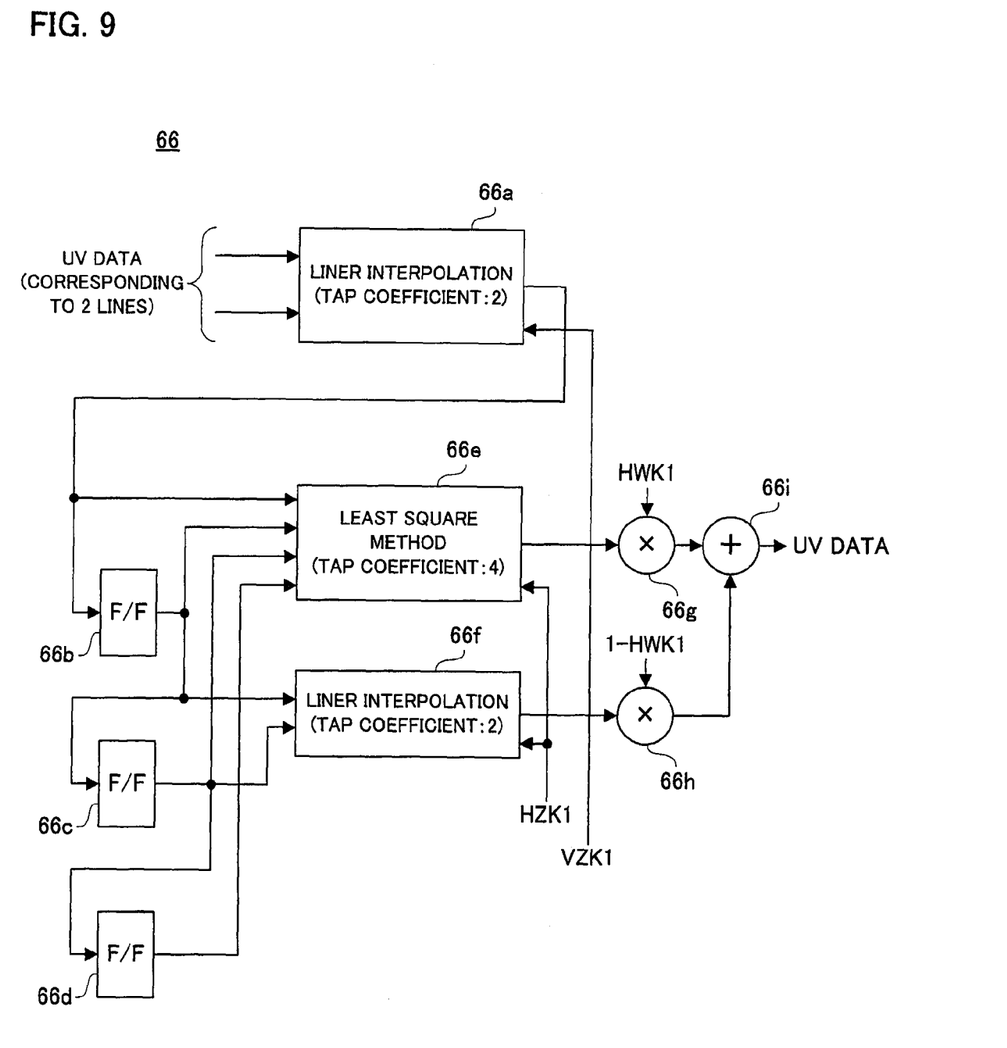
FIG. 9 is a block diagram showing one example of a configuration of another zoom circuit for displaying applied to the embodiment in FIG. 6.

The zoom circuit for displaying 66 is configured as shown in FIG. 9. The inputted UV data of two lines are subjected to linear interpolation according to the vertical zoom coefficient for displaying VZK1 by an interpolation circuit 66a. Thus, the vertical zoom is completed. The UV data outputted from the interpolation circuit 66a is directly applied to an interpolation circuit 66e, and applied to the interpolation circuit 66e via at least one of F/F circuits 66b, 66c and 66d connected in series. The UV data outputted from each of the F/F circuits 66b and 66c are also applied to an interpolation circuit 66f. That is, the horizontal 4-pixels of UV data are simultaneously inputted to the interpolation circuit 66e, and the UV data of the central two pixels out of the horizontal four pixels are simultaneously inputted to the interpolation circuit 66f.

The interpolation circuit 66e adopts a least square method as an interpolation method, and the interpolation circuit 66f adopts a linear interpolation as an interpolation method. Each of the interpolation circuits 66e and 66f creates 1-pixel of UV data by the interpolating process referring to the horizontal zoom coefficient for displaying HZK1. A multiplier 66g multiplies the Y data outputted from the interpolation circuit 66e by the horizontal weighting coefficient for displaying HWK1, and a multiplier 66h multiplies the Y data outputted from the interpolation circuit 66f by "1-HWK1". The outputs from the multipliers 66g and 66h are then added to each other by an adder 66i. Thus, the horizontal zoom is completed.

Figure 10:
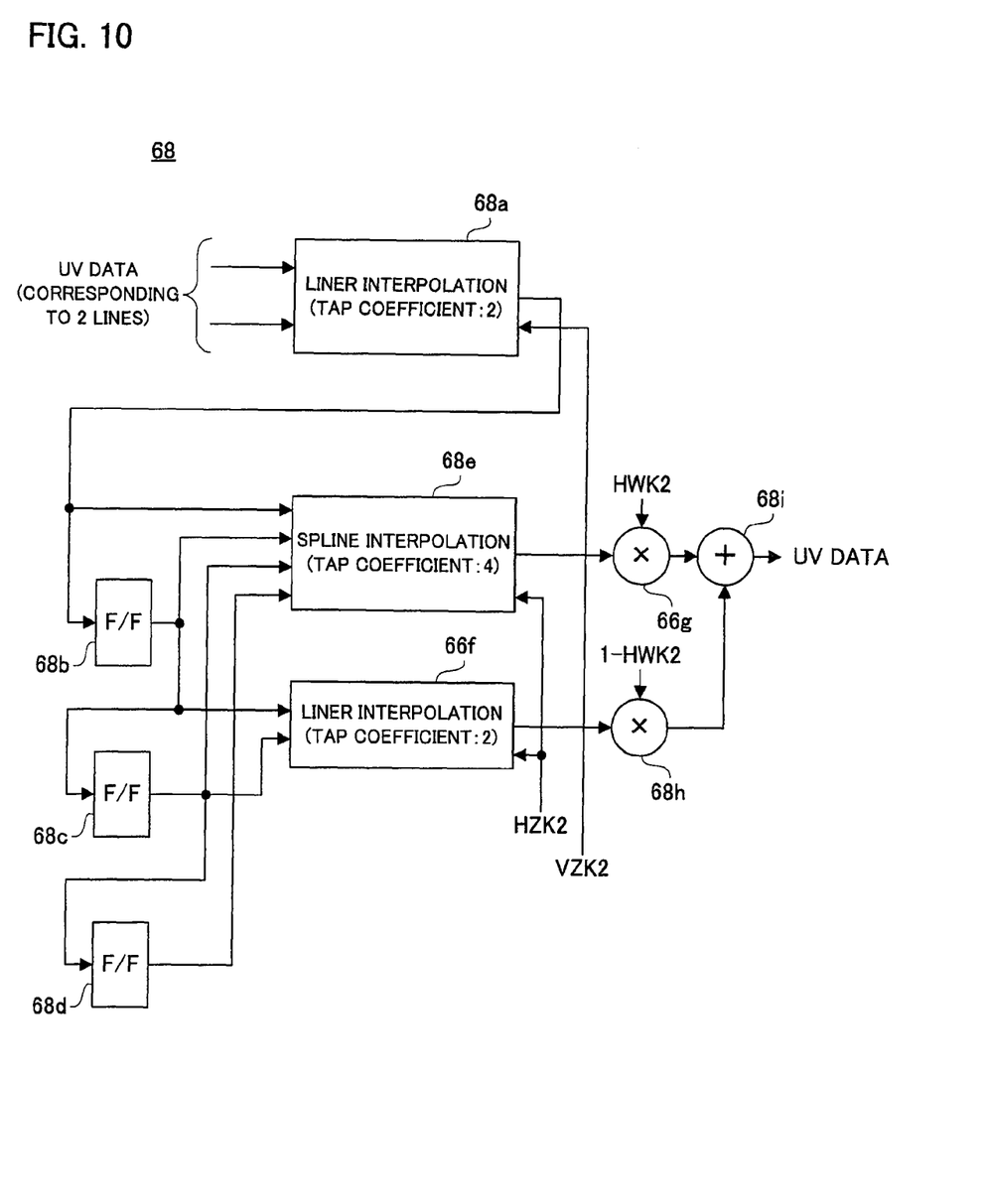
FIG. 10 is a block diagram showing one example of a configuration of another zoom circuit for recording applied to the embodiment in FIG. 6.

The zoom circuit for recording 68 is configured as shown in FIG. 10. It is noted that the zoom circuit for recording 68 is the same as the zoom circuit for displaying 66 except that an interpolation circuit 68e executes the spline interpolation in place of the interpolation according to the least square method, an interpolation circuit 68a refers to the vertical zoom coefficient for recording VZK2 in place of the vertical zoom coefficient for displaying VZK1, each of the interpolation circuits 68e and 66f refers to the horizontal zoom coefficient for recording HZK2 in place of the horizontal zoom coefficient for displaying HZK1, the multiplier 66g uses the horizontal weighting coefficient for recording HWK2 in place of the horizontal weighting coefficient for displaying HWK1, and a multiplier 68h uses "1-HWK2" in place of the "1-HWK1". Thus, the duplicated description is omitted.

Figure 11:
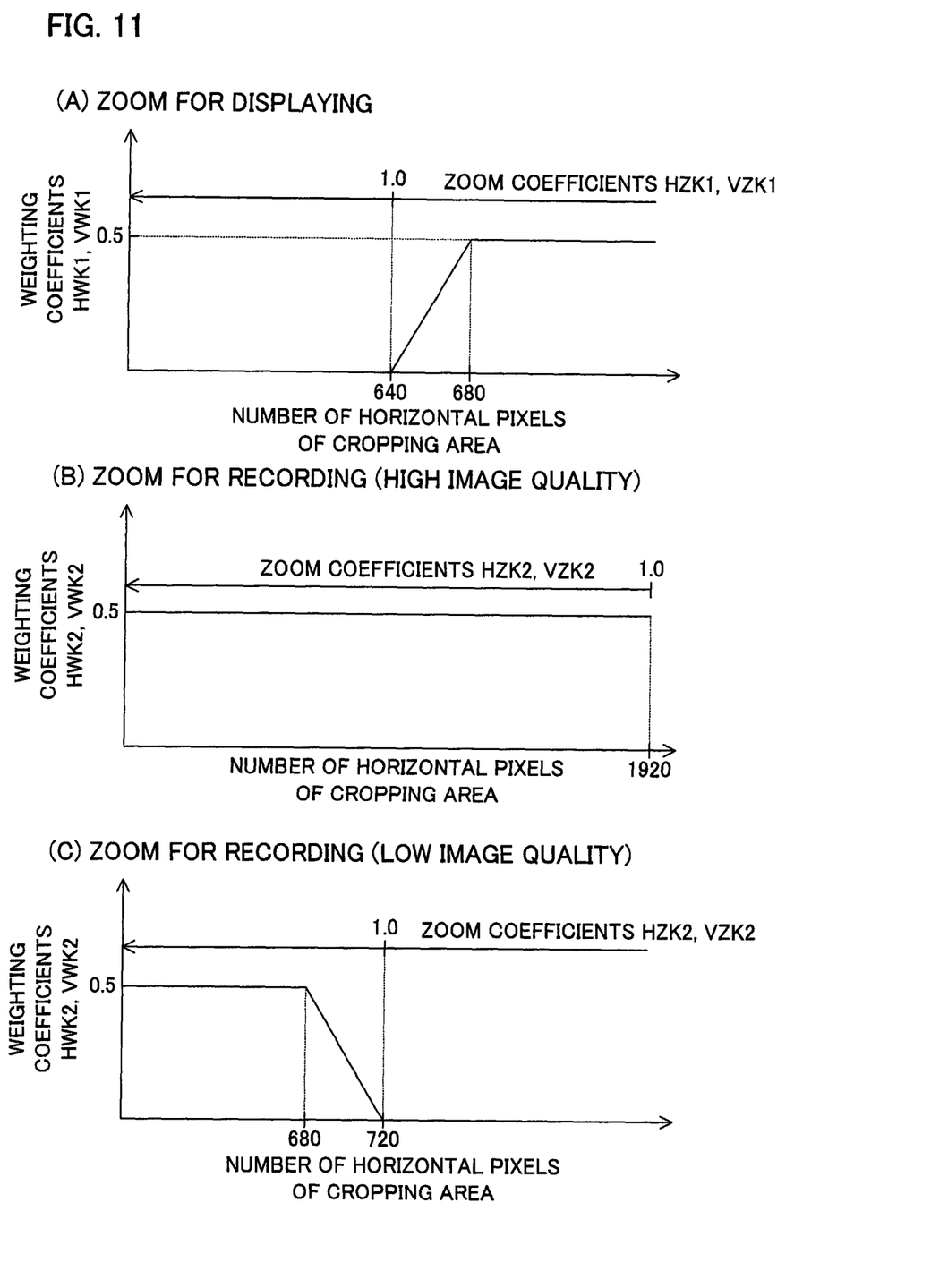
FIG. 11(A) is a graph showing one example of characteristics of a zoom coefficient for displaying and a weighting coefficient for displaying.
FIG. 11(B) is a graph showing one example of a characteristic of a zoom coefficient for recording and a weighting coefficient for recording.
FIG. 11(C) is a graph showing another example of a characteristic of the zoom coefficient for recording and the weighting coefficient for recording.

With reference to FIG. 11(A), each of the horizontal weighting coefficient for displaying HWK1 and the vertical weighting coefficient for displaying VWK1 increases as the number of horizontal pixels of the cropping area increases. More specifically, each of the horizontal weighting coefficient for displaying HWK1 and the vertical weighting coefficient for displaying VWK1 indicates "0" in a range of less than 640 pixels, indicates "0.5" in a range of equal to or more than 680 pixels, and linearly increases from "0" to "0.5" as it approaches from 640 pixels to 680 pixels. Furthermore, each of the horizontal zoom coefficient for displaying HZK1 and the vertical zoom coefficient for displaying VZK1 increases as the number of horizontal pixels of the cropping area decreases, and indicates "1.0" at 640 pixels.

With reference to FIG. 11(B), each of the horizontal weighting coefficient for recording HWK2 and the vertical weighting coefficient for recording VWK2 indicates "0.5" all the time with respect to the "high image quality". Furthermore, each of the horizontal zoom coefficient for recording HZK2 and the vertical zoom coefficient for recording VZK2 corresponding to the "high image quality" increases as the number of horizontal pixels of the cropping area decreases, and indicates "1.0" at 1920 pixels.

With reference to FIG. 11(C), with respect to the "low image quality", each of the horizontal weighting coefficient for recording HWK2 and the vertical weighting coefficient for recording VWK2 decreases as the number of horizontal pixels of the cropping area increases. More specifically, each of the horizontal weighting coefficient for recording HWK2 and the vertical weighting coefficient for recording VWK2 corresponding to the "low image quality" indicates "0.5" in a range of less than 680 pixels, indicates "0" in a range equal to or more than 720 pixels, and linearly decreases from "0.5" to "0" as it approaches from 680 pixels to 720 pixels. Additionally, each of the horizontal zoom coefficient for recording HZK2 and the vertical zoom coefficient for recording VZK2 corresponding to the "low image quality" increases as the number of horizontal pixels of the cropping area decreases, and indicates "1.0" at 720 pixels.

Out of the least square method and the linear interpolation adopted by each of the zoom circuits for displaying 56 and 66, the least square method is suitable for a reduction zoom. Additionally, out of the spline interpolation and the linear interpolation adopted by each of the zoom circuits for recording 58 and 68, the spline interpolation is suitable for the enlargement zoom.

Each of the horizontal weighting coefficient for displaying HWK1 and the vertical weighting coefficient for displaying VWK1 changes for the number of horizontal pixels of the cropping area as shown in FIG. 11(A). Each of the horizontal weighting coefficient for recording HWK2 and the vertical weighting coefficient for recording VWK2 corresponding to the "low image quality" changes for the number of horizontal pixels of the cropping area as shown in FIG. 11(C). Thus, in each of the zoom circuits for displaying 56 and 66, the interpolation according to the least square method is made valid in a range within which the number of horizontal pixels of the cropping area exceeds the "640 pixels". Furthermore, in the zoom circuits for recording 58 and 68, the spline interpolation is made valid in a range within which the number of horizontal pixels of the cropping area falls below the "720 pixels". This makes it possible to inhibit deterioration in quality of the display image data and the recording image data resulting from the change in size of the cropping area in response to a zoom operation.

Figure 12:
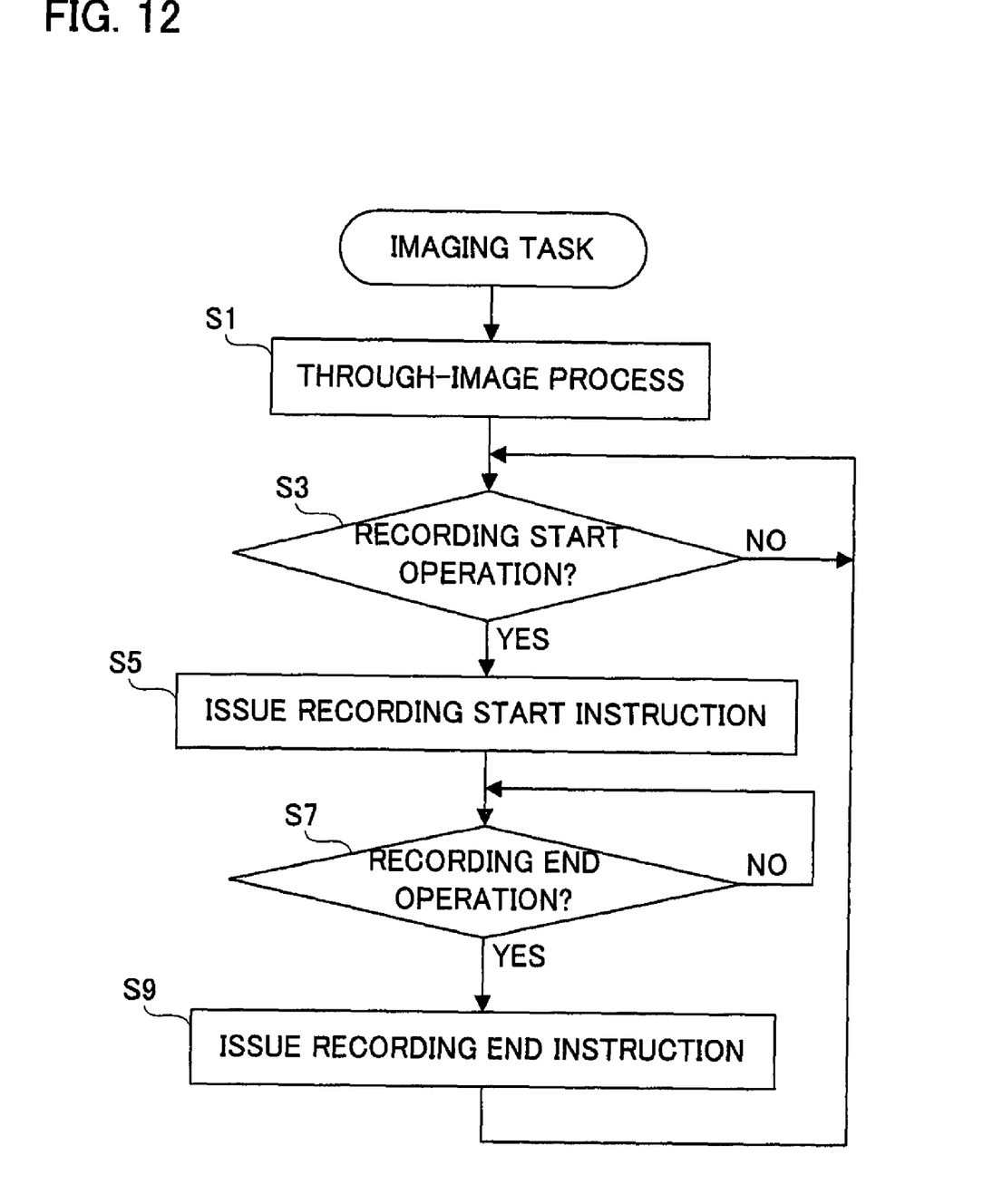
FIG. 12 is a flowchart showing one portion of an operation of a CPU applied to the embodiment in FIG. 1.
Figure 13:
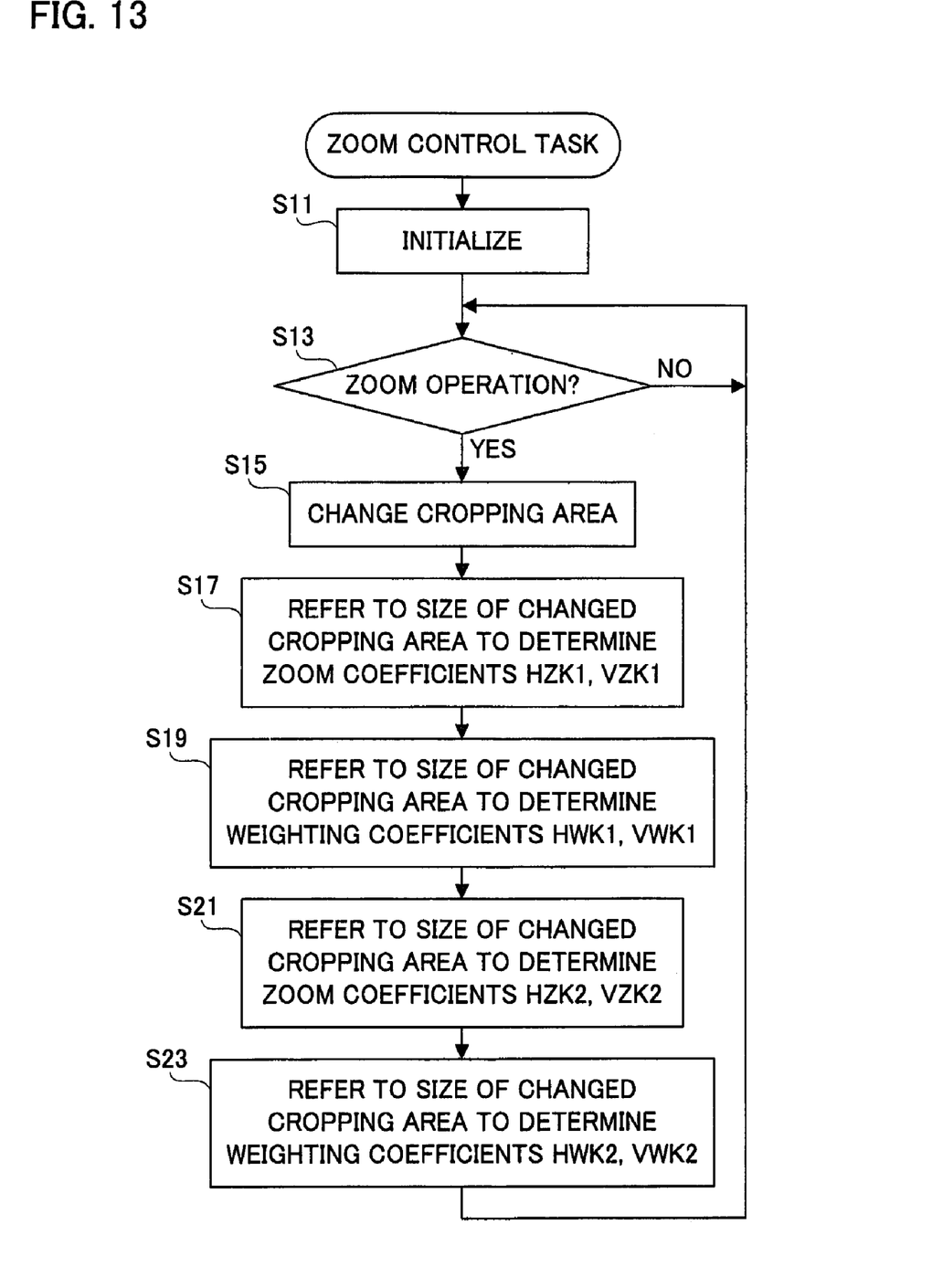
FIG. 13 is a flowchart showing another portion of the operation of the CPU applied to the embodiment in FIG. 1.

The CPU 18 executes in parallel a plurality of tasks including an imaging task shown in FIG. 12 and a zoom control task shown in FIG. 13. It is noted that control programs corresponding to these tasks are stored in a flash memory 38.

With reference to FIG. 12, the through-image process is executed in a step S1. As a result, a through image is outputted from the LCD monitor 28. When the recording start operation is performed, YES is determined in a step S3, and the recording starting instruction is applied to the post-processing circuit 30 and the I/F 32 in a step S5. Thus, the recording image data is created by the post-processing circuit 30, and the created recording image data is recorded in the recording medium 34 by the I/F 32. When the recording end operation is performed, YES is determined in a step S7, and the recording end instruction is applied to the post-processing circuit 30 and the I/F 32 in a step S9. Thus, creating and recording of the recording image data are ended. Upon completion of the process in the step S9, the process returns to the step S3.

With reference to FIG. 13, in a step S11, the size and position of the cropping area, the horizontal zoom coefficient for displaying HZK1, the vertical zoom coefficient for displaying VZK1, the horizontal weighting coefficient for displaying HWK1, the vertical weighting coefficient for displaying VWK1, the horizontal zoom coefficient for recording HZK2, the vertical zoom coefficient for recording VZK2, the horizontal weighting coefficient for recording HWK2, and the vertical weighting coefficient for recording VWK2 are initialized. When the zoom operation is performed, YES is determined in a step S13, and the size and position of the cropping area are changed in a step S15.

In a step S17, with reference to the size of the changed cropping area, the horizontal zoom coefficient for displaying HZK1 and the vertical zoom coefficient for displaying VZK1 are determined, and in a step S19, with reference to the size of the changed cropping area, the horizontal weighting coefficient for displaying HWK1 and the vertical weighting coefficient for displaying VWK1 are determined (see FIG. 11(A)). In a step S21, with reference to the size of the changed cropping area, the horizontal zoom coefficient for recording HZK2 and the vertical zoom coefficient for recording VZK2 are determined, and in a step S23, with reference to the changed cropping area, the horizontal weighting coefficient for recording HWK2 and the vertical weighting coefficient for recording VWK2 are determined (see FIG. 11(B) and FIG. 11(C)). Upon completion of the process in the step S23, the process returns to the step S13.

As understood from the above description, the zoom circuits for displaying 56 and 66 perform a zoom process (zoom process of a first manner) using the least square method and the linear interpolation on the image data (original image data) from the YUV conversion circuit 48 to create the display image data. The LCD monitor 28 displays an image based on the display image data thus created. Additionally, the zoom circuits for recording 58 and 68 perform the zoom process (zoom process of a second manner) using the spline interpolation and the linear interpolation on the image data from the YUV conversion circuit 48 to create the recording image data. Herein, the zoom process for recording is executed in parallel with the zoom process for displaying. The I/F 32 records the recording image data thus created in the recording medium 34.

In this manner, the display image data and the recording image data are created by the zoom processes different in manner from each other. In addition, the zoom process for recording is executed in parallel with the zoom process for displaying. This makes it possible to generate the display image and the recording image which are associated with each other in a short period of time and with high quality.

It is noted that in this embodiment, recording a moving image is assumed. However, a still image may be recorded instead of the moving image. In this case, the display image relating to the recording image is displayed in a freeze state on the monitor screen in parallel with the recording process.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing apparatus, comprising:
a first zoom processor which creates display image data by performing a first-manner zoom process on original image data,
a displayer which displays an image based on the display image data created by said first zoom processor;
a second zoom processor which creates recording image data by performing a second-manner zoom process parallel to the first-manner zoom process, on the original image data; and
a recorder which records the recording image data created by said second zoom processor into a recording medium,
wherein said first zoom processor includes a first interpolator which executes in parallel a plurality of first interpolating processes different to one another and a first weighted adder which performs weighted-addition considering a difference between a number of pixels of the original image data and a number of pixels of the display image data, on a plurality of outputs from said first interpolator,
wherein said second zoom processor includes a second interpolator which executes in parallel a plurality of second interpolating processes different to one another and a second weighted adder which performs weighted-addition considering a difference between a number of pixels of the original image data and a number of pixels of the recording image data, on a plurality of outputs from said second interpolator, and
wherein the number of pixels of the display image data is smaller than the number of pixels of the recording image data, said first interpolator includes a first specific interpolator for reduction zoom, and said second interpolator includes a second specific interpolator for enlargement zoom,
said data processing apparatus further comprising:
a number-of-pixels changer which changes the number of pixels of the original image data in response to a zoom operation;
a first weighted-amount changer which increases a weighted amount for said first specific interpolator in a range within which the number of pixels of the original image data falls below a first reference value; and
a second weighted-amount changer which increases a weighted amount for said second specific interpolator in a range within which the number of pixels of the original image data exceeds a second reference value.

2. A data processing apparatus according to claim 1, wherein said first specific interpolator executes an interpolating process according to a least square method, and said second specific interpolator executes a spline interpolating process.

3. A data processing apparatus according to claim 2, wherein the first reference value corresponds to the number of pixels of the display image data, and the second reference value corresponds to the number of pixels of the recording image data.

4. A data processing apparatus according to claim 1, wherein the first reference value corresponds to the number of pixels of the display image data, and the second reference value corresponds to the number of pixels of the recording image data.

5. A data processing apparatus according to claim 1, wherein each of the original image data, the display image data, and the recording image data is image data representing a moving image.

* * * * *